United States Patent
Appelt et al.

(10) Patent No.: US 6,428,418 B1
(45) Date of Patent: Aug. 6, 2002

(54) UNIVERSAL JOINT YOKE

(75) Inventors: Herbert Appelt, Diepholz; Sonja Winsel, Uchte, both of (DE)

(73) Assignee: Nacam Deutschland GMBG (DE)

( * ) Notice: Subject to any disclaimer, the term of this patent is extended or adjusted under 35 U.S.C. 154(b) by 0 days.

(21) Appl. No.: 09/646,942
(22) PCT Filed: Jan. 20, 2000
(86) PCT No.: PCT/DE00/00166
§ 371 (c)(1), (2), (4) Date: Oct. 30, 2000
(87) PCT Pub. No.: WO00/43689
PCT Pub. Date: Jul. 27, 2000

(30) Foreign Application Priority Data

Jan. 23, 1999 (DE) .......................... 199 02 608

(51) Int. Cl.$^7$ ................................. F16D 3/16
(52) U.S. Cl. .................... 464/134; 464/112; 464/130
(58) Field of Search ................ 464/112, 130, 464/134, 135, 136

(56) References Cited

U.S. PATENT DOCUMENTS

| 2,773,368 A | * | 12/1956 | Slaght | ........................ 464/130 |
| 3,222,143 A | | 12/1965 | Macchini | |
| 4,583,960 A | * | 4/1986 | Joyner | ........................ 464/134 |
| 4,846,763 A | * | 7/1989 | De Stefano | .................. 464/136 |
| 4,995,849 A | * | 2/1991 | Castellon | |
| 5,417,613 A | * | 5/1995 | Aiken | ........................ 464/130 |
| 5,601,377 A | | 2/1997 | Ohya | |

FOREIGN PATENT DOCUMENTS

| DE | 31 44 81 11 | 5/1983 | | |
| DE | 35 02 696 | 7/1986 | | |
| DE | 37 36 516 | 2/1991 | | |
| DE | 197 43 585 | 4/1998 | | |
| FR | 2 165 020 | 8/1973 | | |
| GB | 2040395 | * | 8/1980 | .................. 464/134 |
| GB | 2053417 | * | 2/1981 | .................. 464/130 |
| GB | 2102914 | * | 2/1983 | .................. 464/134 |

* cited by examiner

Primary Examiner—Lynne H. Browne
Assistant Examiner—Aaron Dunwoody
(74) Attorney, Agent, or Firm—McGlew and Tuttle, P.C.

(57) ABSTRACT

A universal joint yoke with two parallel yoke legs, which have a partial area for a bearing eye hole, is presented, in which the inner sides of the yoke legs facing one another have areas of thickened material in the unfinished state in the areas of the bearing eye holes. Due to this feature according to the present invention, it is possible to obtain a sufficient mounting overlap for the needle bearings arranged in the bearing eye holes, on the one hand, and a maximum possible passage is obtained at the same time for a through hole necessary for the connection to connection profiles in the universal joint yoke.

13 Claims, 2 Drawing Sheets

UNIVERSAL JOINT YOKE

FIELD OF THE INVENTION

The present invention pertains to a universal joint yoke with two parallel yoke legs, which have a partial area for a bearing eye hole.

BACKGROUND OF THE INVENTION

Universal joint yokes of this class are used as forged parts in all areas of mechanical engineering, especially also in the manufacture of passenger cars and utility vehicles. The universal joint yokes used are connected here to usually round connection profiles on the side of the universal joint facing away from the yoke legs. A hole, which may be additionally provided with internal teeth, is prepared for this purpose in the corresponding universal joint. These internal teeth are usually prepared by a broaching operation by means of broaching tools. The broaching operation requires a certain free space in the area between the two legs of the yoke, so that the possible maximum axial diameter for the broaching or drilling operation is determined by the distance between the legs of the yoke. Due to this geometric dependence, universal joints of different sizes are commonly used for connection profiles of different sizes according to the state of the art. Different joint yoke sizes in turn require different individual components, as a result of which the manufacturing costs of such universal joint yokes of this class are increased as a consequence of increased stocking expenses and the small numbers of components manufactured.

It should be noted in connection with the different universal joint sizes used in the state of the art that the needle bearings arranged in the bearing eye holes within the legs of the yoke require a certain overlap, i.e., a certain thickness of the yoke legs. It is therefore often impossible to increase the dimensions between the legs of the yoke to bring about a larger maximum passage for a connection profile because of the preset external dimensions of the universal joint yokes.

SUMMARY AND OBJECTS OF THE INVENTION

The object of the present invention is therefore to improve a universal joint yoke of this class such that despite a sufficient overlap for the needle bearings used in the bearing eye holes, a maximum mating dimension for the use of larger connection profiles is possible in order to thus reduce the number of joint sizes for different connection profiles.

This object is accomplished according to the present invention by the inner sides of the legs of the yoke which face one another having an area of thickened material in the unfinished state of the universal joint yoke in the areas of the of bearing eye holes.

The area of thickened material in the areas of the bearing eye holes has the effect that after the corresponding bearing eye holes have been prepared, a greater overlap is formed at the edges of these holes for the needle bearings than that present in universal joint yokes according to the state of the art. On the other hand, the original thickness of the yoke leg and the distance between the legs of the yoke is preserved as a free space, so that larger connection profiles can be connected with the universal joint yoke than before. The larger connection profiles make it possible for the first time to connect the larger connection profiles known from utility vehicles with smaller universal joint yokes from, e.g., the manufacture of passenger cars. Existing steering gear connections or steering column connections of utility vehicles can thus be used together with the universal joint components of passenger cars, which are less expensive because of their size. The joint use of utility vehicle and passenger car components is favorable for the standardization of components, manufacture and assembly, which in turn increases the interchangeability of the individual components and contributes to a reduction in the cost of the manufacturing process. Moreover, already existing joint components, such as needle bearings, seals and inner crosses of the passenger car assembly unit can be used without change due to the measure according to the present invention. The use of the inventive feature also extends, of course, to all usual passenger car universal joint yokes, in which standardization can be brought about as well.

An exemplary embodiment of the subject of the present invention will be explained in greater detail below based on the attached drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
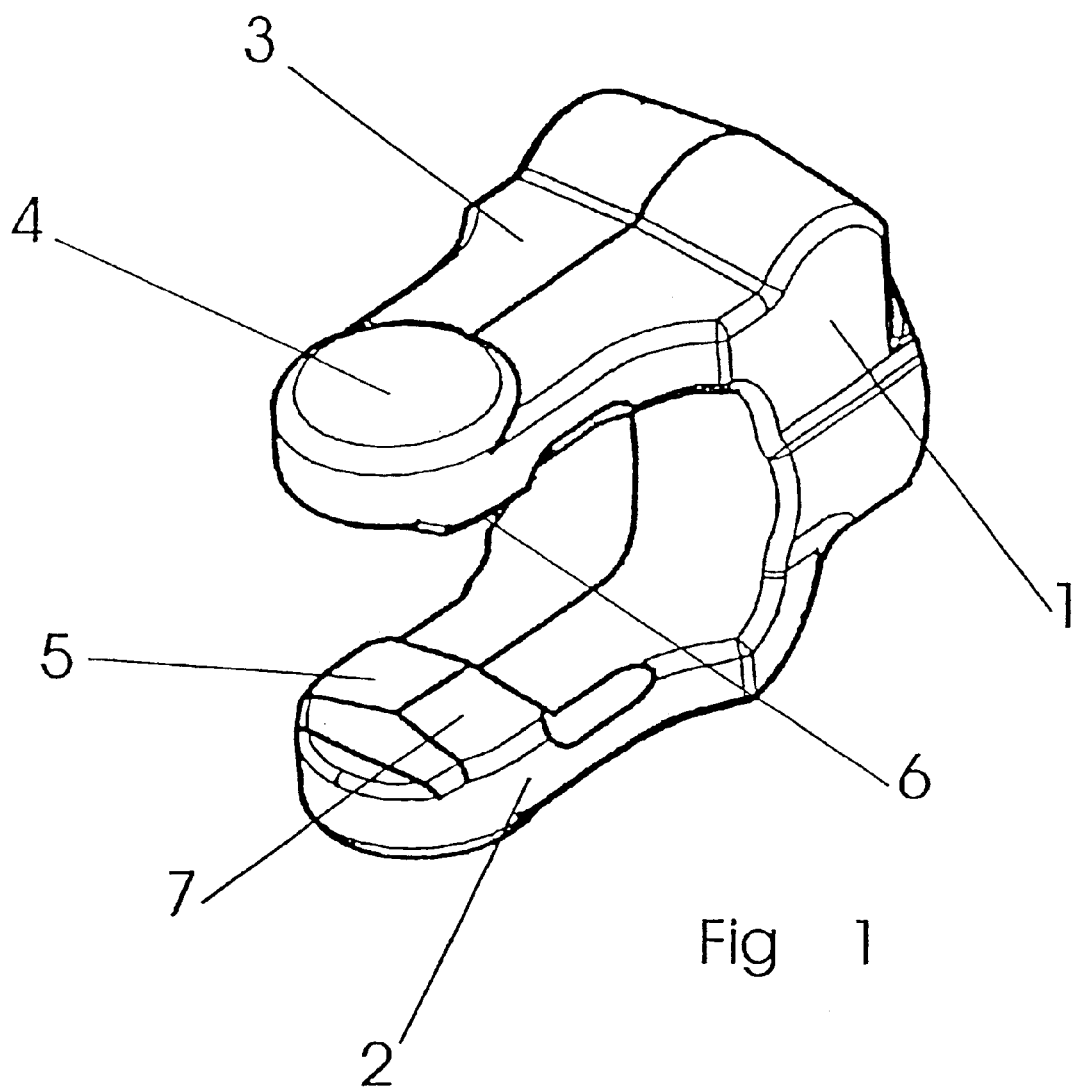
FIG. 1 is a perspective view of the universal joint yoke according to the present invention in the forged, unfinished state.

Referring to the drawings in particular, the unfinished forged part of the universal joint yoke according to the present invention shown in FIG. 1 has a connection head 1 and two fork legs 2 and 3 joining the connection head in a U-shaped pattern. The legs of the yoke are rounded at their free front ends and have a respective partial area 4 and 5 at this end for a bearing eye hole each. An area of thickened material 6 and 7 each is located in the partial areas 4 and 5, in which the bearing eye holes will be prepared during the machining of the universal joint yoke on the inner sides of the yoke legs 2 and 3, where the said inner sides face one another and the said yoke legs are arranged in a U-shaped pattern. This area of thickened material has a thickness of 2–5 mm and projects by this dimension over the surface of the respective inner side of the yoke leg. The width of the areas of thickened material 6 and 7 is selected to be such that it is smaller than the bearing eye holes prepared in the partial areas 4 and 5.

Figure 2:
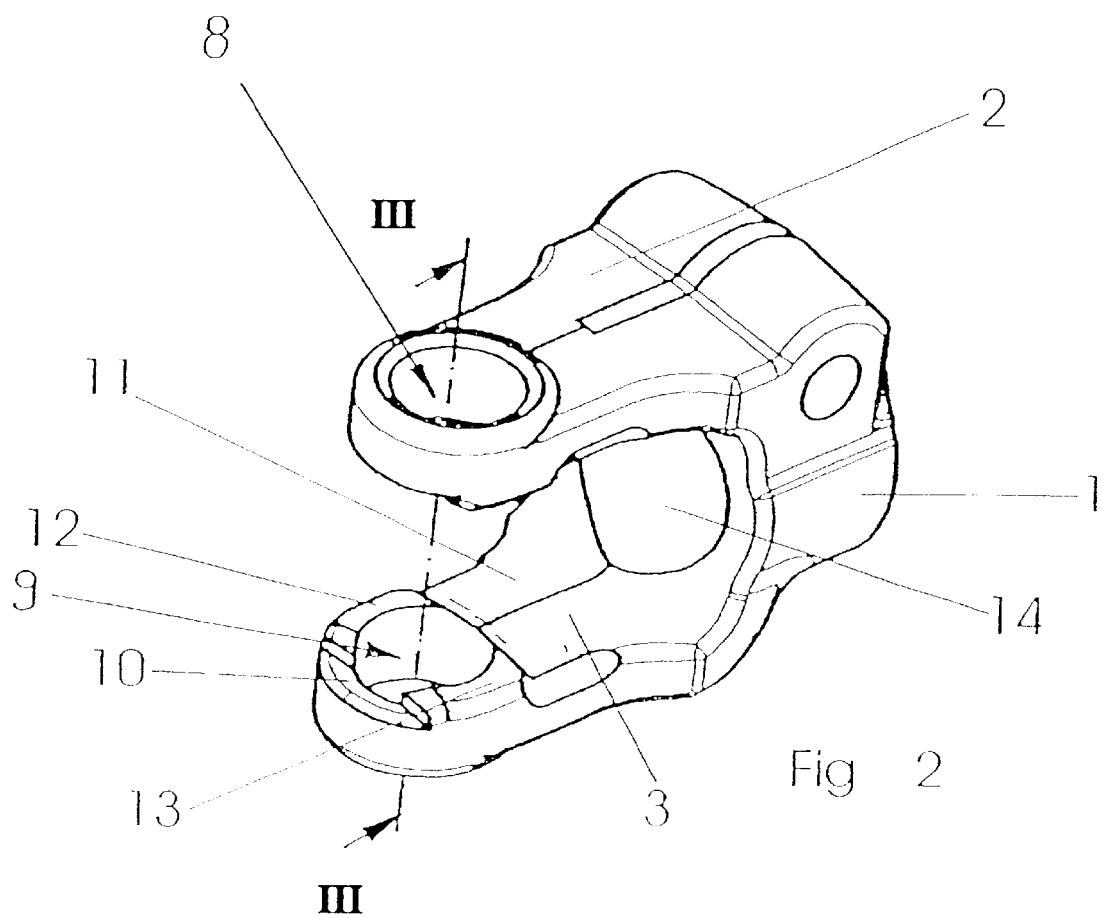
FIG. 2 is a perspective view of the universal joint yoke from FIG. 1 in the finished state.

This can be seen especially in FIG. 2. This figure shows that a respective bearing eye hole 8 and 9 was prepared in the partial areas 4 and 5, and these two holes 8 and 9 are aligned with one another. A partial area 10, which has the same surface level as the inner surface area 11 located on the other side of the bearing eye hole on the inner side of a yoke leg 2 or 3, is left at the tip of the yoke leg next to the areas of thickened material 6 and 7. The place determined by the bearing eye hole for a needle bearing to be inserted therein thus has two different overlap areas when viewed in its depth. There is a smaller overlap at the free front end in the partial area 10 as well as at the rear end facing the connection head 1 than in the lateral areas 12 and 13 of the bearing eye hole. However, it is guaranteed by the selected dimension of the respective areas of thickened material 6 and 7 that the lateral partial areas 12 and 13 with their greater overlap are sufficient for the correct mounting of the needle bearing.

Figure 3:
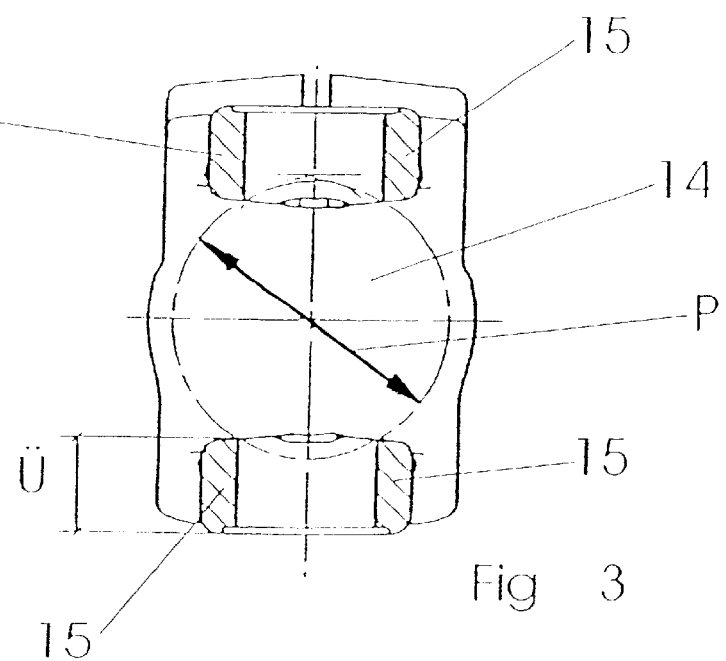
FIG. 3 is a sectional view in the section plane III—III from FIG. 2 of the universal joint yoke according to the present invention.

FIG. 2 shows, moreover, that a through passage hole 14 is prepared in the connection head 1. The diameter of this through hole 14 is the determining size for a connection profile of a steering shaft or a steering gear to be used. As is apparent from FIG. 3, the maximum diameter dimension for the through hole 14, which is indicated by the arrow P, is limited by the lateral areas 15, in which the overlap dimension U necessary for the correct mounting of the needle bearing is still present. The maximum possible diameter P for the through hole 14 is shown in FIG. 3 by a dash-dotted circle for illustration. The through hole 14 is prepared by a drilling or broaching operation, and material is also removed at the same time by the drill or broaching tool in the area in which the perpendicular through hole for receiving the needle bearing is arranged.

While specific embodiments of the invention have been shown and described in detail to illustrate the application of the principles of the invention, it will be understood that the invention may be embodied otherwise without departing from such principles.

What is claimed is:

1. A universal joint yoke, comprising:

a first yoke leg having a bearing eye hole;

a second yoke leg substantially parallel to said first yoke leg, said second yoke leg having a bearing eye hole, each of said first yoke leg and said second yoke leg having a leg partial area defining the associated bearing eye hole with inner lateral side areas facing one another having an increased thickness and a front end inner surface partial area adjacent to said lateral side areas and an opposite rear inner surface partial area adjacent to said lateral side areas having substantially the same surface level of a reduced thickness relative to said inner lateral side areas whereby a thickness of a circumference of said bearing eye holes vary around said bearing eye holes.

2. A universal joint yoke in accordance with claim 1, wherein the height of the area of increased thickness comprises thickened material projecting toward the inside of the yoke from 2–5 mm in relation to the front end partial area surface and opposite rear partial area of the inner sides of the yoke legs.

3. A universal joint yoke of forged design, the yoke comprising:

a connection head;

two substantially parallel yoke legs with inner sides facing each other, said yoke legs extending from said connection head, each of said yoke legs having a partial area defining a bearing eye hole, said inner sides of said yoke legs are provided with a thickened material in an area of said bearing eye holes in a non-machined state, each said bearing eye hole being prepared aligned with one another in said partial areas, a passage hole formed in said connection head and during the preparation of which material is removed at the same time in said partial areas of said bearing eye hole to accommodate needle bearings, leaving lateral side areas of thickened material at portions of a circumferential region of said bearing eye holes and a front end inner surface partial area adjacent to said lateral side areas and an opposite rear inner surface partial area adjacent to said lateral side areas having substantially the same surface level of a reduced thickness relative to said inner lateral side areas with a thickness of the circumferential region of said bearing eye holes varying around said bearing eye holes.

4. A universal joint yoke in accordance with claims 3, 1, wherein the height of the area of increased thickness comprises thickened material projecting toward the inside of the yoke from 2–5 mm in relation to the front end partial area surface and opposite rear partial area of the inner sides of the yoke legs.

5. A universal joint yoke comprising:

a connection head;

a yoke leg extending from said connection head, said yoke leg having an end defining a bearing eye hole with a partial area defining the bearing eye hole with inner lateral side areas facing one another having an increased thickness and a front end inner surface partial area adjacent to said lateral side areas and an opposite rear inner surface partial area adjacent to said lateral side areas having substantially the same surface level of a reduced thickness relative to said inner lateral side areas, a thickness of said yoke leg varying around a peripheral area of said bearing eye hole.

6. A yoke in accordance with claim 5, further comprising:

another yoke leg extending from said connection head, said another yoke leg having an end defining another bearing eye hole with a partial area for the bearing eye hole with inner lateral side areas facing one another having an increased thickness and a front end inner surface partial area adjacent to said lateral side areas and an opposite rear inner surface partial area adjacent to said lateral side areas having substantially the same surface level of a reduced thickness relative to said inner lateral side areas, a thickness of said another yoke leg varying around the peripheral area of said another bearing eye hole.

7. A yoke in accordance with claim 6, wherein:

said bearing eye holes are arranged on an end of said yoke legs diametrically opposite said connection head, each of said yoke legs having a longitudinal extent from said connection head to a respective said bearing eye hole, said yoke legs include inner sides facing each other, said inner sides defining inner bearing hole peripheral areas of said bearing eye holes, lateral side portions of said inner bearing hole peripheral area extending further toward an opposite said yoke leg than longitudinally front and rear portions of said inner bearing hole peripheral area.

8. A yoke in accordance with claim 6, wherein:

said yoke legs and said connection head are formed by forging.

9. A yoke in accordance with claim 5, wherein:

said bearing eye hole is arranged on an end of said yoke leg diametrically opposite said connection head, said yoke leg has a longitudinal extent from said connection head to said bearings eye hole, a thickness of portions of said peripheral area of said yoke leg on opposite longitudinal ends of said bearing eye hole being less than a thickness of portions of said peripheral area between said opposite longitudinal ends.

10. A yoke in accordance with claim 5, wherein:

said yoke and said connection head are formed as a forged part.

11. A yoke in accordance with claim 5, wherein:

said connection head defines a passage hole with an axis substantially perpendicular to an axis of said bearing eye hole, said thickness of said peripheral area of said bearing eye hole varying to form a spacing of said yoke legs with respect to a projection of said passage hole.

12. A yoke in accordance with claim 11, wherein:

said projection of said passage hole is in a direction of said yoke leg.

13. A method for forming a universal joint yoke, the method comprising the steps of:

forging a part into a connection head with two yoke legs extending from said connection head, said forging including providing ends of said yoke legs opposite said connection head with partial areas thicker than a remainder of said yoke legs;

forming a passage in said connection head and said ends of said yoke legs by removing portions of said connection head and said partial areas corresponding to a connection profile through said joint yoke; and forming bearing eye holes in said ends of said yoke legs, said bearing eye holes having a diameter larger than a length of said partial areas to leave lateral side areas of thickened material at portions of a circumferential region of said bearing eye holes and a front end inner surface partial area adjacent to said lateral side areas and an opposite rear inner surface partial area adjacent to said lateral side areas having a reduced thickness relative to said inner lateral side areas with a thickness of a peripheral region of each said bearing eye hole varying around the respective said bearing eye hole.

* * * * *